Patented July 31, 1945

2,380,710

UNITED STATES PATENT OFFICE 2,380,710

CATALYSTS FOR POLYMERIZATION REACTION

William D. Stewart, Akron, Ohio, assignor, by mesne assignments, to The B. F. Goodrich Company, Akron, Ohio, a corporation of New York No Drawing. Application October 22, 1941, Serial No. 416,087

12 Claims. (Cl. 260—84.5)

This invention relates to the polymerization of unsaturated organic compounds which are capable of undergoing an addition polymerization to form high molecular weight linear polymers, and particularly to the polymerization in the form of an aqueous emulsion of a butadiene either alone or in admixture with a monemer copolymerizable therewith. The principal object of the invention is to provide a method for decreasing the time required to effect such polymerization reactions.

I have discovered that the time required to effect polymerization reactions may be decreased by polymerizing unsaturated organic compounds in the presence of a compound containing the group $$-NH-\overset{X}{\underset{\|}{C}}-\overset{|}{N}-R$$

where R represents an acidic group and X represents one of the groups =O and =NH. R may be any desired acidic group and may or may not form part of a ring structure. Groups containing a doubly or triply bonded carbon atom such as $$-\underset{\|}{\overset{|}{C}}-\quad\text{or}\quad -C\equiv N$$

connected to the nitrogen either directly or by a single carbon atom are preferred acidic groups.

One of the readily available catalysts within the scope of this invention is dicyandiamidine.

$$NH_2-\overset{NH}{\underset{\|}{C}}-NH-\overset{O}{\underset{\|}{C}}-NH_2$$

which may be employed directly or in the form of a mineral acid salt such as those formed with hydrochloric or sulfuric acid. Other materials include $$NH_2-\overset{NH}{\underset{\|}{C}}-NH-C\equiv N$$

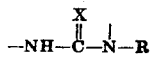
Dicyandiamide

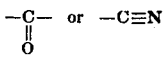
Creatine

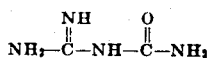
Creatine phosphate

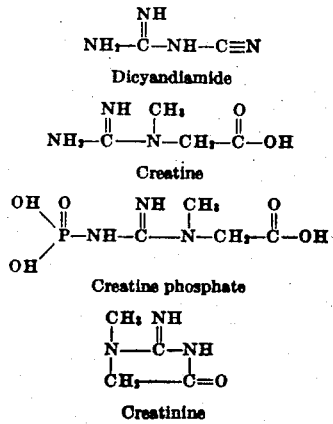
Creatinine

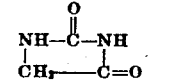
Hydantoin

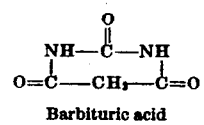
Barbituric acid

Many other compounds containing the same characteristic grouping may also be employed as catalysts to speed up the polymerization.

The preferred methods of practicing this invention will be shown by the following specific examples which illustrate rather than limit the invention.

*Examples I, II, and III*

A mixture containing 5.5 parts by weight of butadiene, 4.5 parts of acrylonitrile, about 25 parts of a 2% solution of myristic acid which had been 85% neutralized with sodium hydroxide, 0.035 part of hydrogen peroxide and 0.06 part of diisopropyl dixanthogen was agitated at 30° C. The polymerization required 20 hours to reach completion. The inclusion of 0.025 part of hydantoin or dicyandiamidine sulfate reduced the time required for the polymerization to reach completion to 14 hours, and a like reduction in the time required was achieved by the use of only 0.015 part of creatine. The products prepared in the presence of the catalysts exhibited excellent milling properties and formed vulcanizates exhibiting high tensile strengths and elongations. The products resisted oil and abrasion to a marked degree, and were capable of use not only as a replacement for natural rubber but also in compositions where rubber cannot be employed because of its inherent defects.

The catalysts of this invention may also be employed in conjunction with heavy metal compounds, in which case the polymerization proceeds more rapidly than when either catalyst is employed alone and the system will tolerate considerably higher proportions of heavy metal. The use of heavy metal compounds as catalysts is claimed in applicant's copending application Serial No. 379,712 filed February 14, 1941. As therein disclosed, the term heavy metal is used to signify metals which have a low atomic volume (ratio of atomic weight to density) and consequently appear substantially at the minimum points on Lothar Meyer's atomic volume curve. The metals appearing in group VIII, subgroup B of groups I and II, and subgroup A of groups VI and VII are accordingly among the metals included in the term heavy metal. The metals of group VIII, particularly iron, cobalt, and nickel, are preferred.

*Example IV*

A mixture of 7 parts of butadiene, 3 parts of styrene, about 25 parts of a 2% solution of myristic acid which had been 95% neutralized with sodium hydroxide, 0.025 part of hydrogen peroxide, and 0.045 part of diisopropyl dixanthogen was agitated at 40° C. in the presence of various catalytic materials. When 0.0005 part of ferric alum were employed, no polymerization occurred in 109 hours; in the presence of 0.0005 part of ferric alum and 0.025 part of dicyandiamidine sulfate, the polymerization was complete in 28 hours.

*Example V*

It may also be advantageous to employ one of the catalysts of this invention in the presence of two heavy metals. When 0.025 part of dicyandiamidine sulfate, 0.005 part of ferric alum, and 0.0005 part of cobaltous chloride were employed as the catalyst in a recipe like that described in Example IV, the polymerization was complete in 14 hours.

Although the preferred method of polymerization is by an emulsion polymerization as set forth in the specific examples, the catalysts herein described may be employed to accelerate the rate of polymerization in homogeneous systems in the presence or absence of solvents or diluents in the manners well known to the prior art.

The catalysts of this invention may be employed in widely varying proportions. The use of from 0.1 to 0.5% by weight based on the polymerizable materials ordinarily gives a pronounced catalytic effect. Noticeable effects are produced by the use of lower concentrations, although the optimum amount for the greatest catalytic effect is ordinarily above 0.1%. Greater amounts such as 1% or more can in general be employed, if desired, without any detrimental effects. Although less than 0.1% of heavy metal compound, preferably in the form of a water-soluble salt is ordinarily employed, the catalysts of this invention which form complexes with heavy metal compounds permit the use of a greater concentration of heavy metal than can be employed in the absence of any complex-forming compound. The complex-forming compound and the heavy metal compound may be added separately to the monomers prior to the polymerization, or may be reacted to form a heavy metal complex before they are added to the monomers.

The catalysts of this invention may be employed in the polymerization of any unsaturated organic compounds which are capable of undergoing an addition polymerization to form a high molecular weight linear polymer. Included in this class of monomers are the butadienes-1,3 such as butadiene-1,3 (commonly termed butadiene), isoprene, 2,3-dimethyl butadiene, piperylene, and chloroprene; aryl olefins such as styrene, vinyl naphthalene, and alpha-chlorostyrene; acrylic and alpha-substituted acrylic acids, esters, nitriles, and amides such as acrylic acid, acrylonitrile, alpha-methacrylonitrile, alpha-chloracrylonitrile, methyl acrylate, methyl methacrylate, methacrylamide; vinyl halides, esters, ethers, and ketones such as vinylidene chloride, vinyl chloride, vinyl acetate, methyl isopropenyl ketone, and methyl vinyl ether. Any of the above compounds all of which contain a

group may also be copolymerized with monomers copolymerizable therewith. Butadiene, for instance, may be copolymerized with one or more monomers which enter into the polymeric chains by 1,2-addition such as acrylonitrile, styrene, methyl acrylate, etc.

As emulsifying agents which may be employed in emulsion polymerizations may be mentioned soaps such as sodium oleate, potassium palmitate, and sodium myristate, synthetic saponaceous materials including hymolal sulfates and alkaryl sulfonates such as sodium lauryl sulfate and sodium isopropyl naphthalene sulfonate, and salts of organic bases containing long carbon chains such as the hydrochloride of diethylaminoethyloleylamide, trimethylcetylammonium methyl sulfate, the hydrochloride of oleylamidoethyldimethylamine, and the hydrochloride of the diethylaminoethoxyanilide of oleic acid. The soaps are employed in polymerizations under basic conditions, the salts of organic bases under acid conditions, and the synthetic saponaceous materials under acid, alkaline, or neutral conditions.

The polymerization may be effected by various known initiators of polymerization such as per-compounds including hydrogen peroxide, benzoyl peroxide, ammonium persulfate, potassium persulfate, and other peroxides and persalts such as persulfates, perborates, percarbonates, and the like, as well as other types of initiators such as diazoaminobenzene, sulfur dioxide, hyposulfites, bisulfites, dipotassium diazomethane disulfonate, and triphenylazobenzene. The polymerization, particularly if conducted homogeneously, may also be initiated by actinic radiation.

The plasticity and solubility of the polymers produced by homogeneous polymerizations may be increased by including in the charge chlorinated compounds such as carbon tetrachloride and trichloracetic acid, while a corresponding effect can be obtained in emulsion polymerizations through the use of sulfur-containing compounds such as the dialkyl dixanthogens, the higher tetraalkyl mono- and polysulfides, mercaptoalkylthiazoles, etc.

Other methods and procedures known to be useful in connection with the polymerization of unsaturated organic compounds are within the spirit and scope of the invention as defined in the appended claims.

I claim:

1. The method which comprises polymerizing in the form of an aqueous emulsion a mixture comprising butadiene-1,3 and a monomer copolymerizable therewith in aqueous emulsion, in the presence of a mixture of dicyandiamidine and a water-soluble salt of a heavy metal of group VIII.

2. The method which comprises polymerizing in the form of an aqueous emulsion a mixture comprising butadiene-1,3 and acrylonitrile in the presence of dicyandiamidine.

3. The method which comprises polymerizing in the form of an aqueous emulsion a mixture comprising butadiene-1,3 and styrene in the presence of dicyandiamidine.

4. The method which comprises polymerizing, in the form of an aqueous emulsion, a mixture of butadiene-1,3 and styrene in the presence of a heavy metal complex containing a heavy metal of group VIII and dicyandiamidine.

5. The method of claim 4 in which the heavy metal is iron.

6. The method of claim 4 in which iron and another heavy metal are employed.

7. The method which comprises subjecting an unsaturated organic compound which contains a

group and undergoes in aqueous emulsion an addition polymerization to form a high molecular weight linear polymer, to addition polymerization in aqueous emulsion in the presence of dicyandiamidine.

8. The method which comprises subjecting an unsaturated organic compound which contains a

group and undergoes in aqueous emulsion an addition polymerization to form a high molecular weight linear polymer, to addition polymerization in aqueous emulsion in the presence of a water-soluble salt of a heavy metal and dicyandiamidine.

9. The method which comprises subjecting an unsaturated organic compound which contains a

group and undergoes in aqueous emulsion an addition polymerization to form a high molecular weight linear polymer, to addition polymerization in aqueous emulsion in the presence of a water-soluble salt of a group VIII heavy metal and dicyandiamidine.

10. The method which comprises polymerizing in aqueous emulsion a mixture of a butadiene-1,3 and a monomer copolymerizable therewith in aqueous emulsion, in the presence of dicyandiamidine.

11. The method which comprises polymerizing a butadiene-1,3 in aqueous emulsion in the presence of dicyandiamidine.

12. The method which comprises polymerizing a butadiene-1,3 in aqueous emulsion in the presence of a water-soluble heavy metal salt and dicyandiamidine.

WILLIAM D. STEWART.